United States Patent [19]

Pees

[11] 4,045,009
[45] Aug. 30, 1977

[54] ENERGY ABSORBING UNIT WITH IMPROVED CONTROL VALVE

[75] Inventor: James M. Pees, Dayton, Ohio

[73] Assignee: General Motors Corporation, Detroit, Mich.

[21] Appl. No.: 632,370

[22] Filed: Nov. 17, 1975

[51] Int. Cl.² .............................. F16F 9/22; F16F 9/34
[52] U.S. Cl. ................................ 267/139; 137/512.15;
137/859; 188/282; 188/314; 267/64 R; 293/70; 293/DIG. 2
[58] Field of Search ............... 188/280, 282, 314, 317;
267/64 R, 116, 139; 137/512.15, 513.3, 851, , 852, 859, 860; 293/70, DIG. 2

[56] References Cited

U.S. PATENT DOCUMENTS

| 1,988,194 | 1/1935 | Erlandsen, Jr. | 188/314 |
| 2,348,160 | 5/1944 | Thornhill | 188/317 |
| 2,937,658 | 5/1960 | Stewart | 137/525.1 X |
| 3,139,989 | 7/1964 | Thornhill | 188/314 X |
| 3,593,978 | 7/1971 | Lohr | 267/64 R |
| 3,794,310 | 2/1974 | Mewhinney | 293/70 X |
| 3,837,445 | 9/1974 | Pierle | 188/282 X |
| 3,904,182 | 9/1975 | Allinquant et al. | 188/282 X |
| 3,920,274 | 11/1975 | Fannin | 267/139 X |
| Re. 20,084 | 9/1936 | Blake | 188/317 |

FOREIGN PATENT DOCUMENTS 131,243  6/1901  Germany .................... 137/512.15

Primary Examiner—George E. A. Halvosa
Attorney, Agent, or Firm—Charles R. White

[57] ABSTRACT

A telescoping energy absorbing unit having inner and outer telescoping cylinders with unitary fluid flow control valve means operatively disposed between contractible and expansible fluid chambers in the unit. The valve progressively opens with increasing loads above a predetermined load to control the flow of fluid from a first of the chambers to a second of the chambers for absorbing impact energy. The valve closes on rebound and has openings therein that meter fluid from the second to the first chamber to reduce the speed of rebound of the cylinders from a telescoped toward an extended position.

2 Claims, 5 Drawing Figures

ENERGY ABSORBING UNIT WITH IMPROVED CONTROL VALVE

This invention relates to energy absorber units having telescopically mounted inner and outer cylinders movable between extended and telescoped positions which may be effectively employed to mount a bumper assembly to a vehicle. More particularly this invention relates to such an energy absorber unit having a new and improved valve means operatively mounted between expandible and contractible chambers of the unit to control the flow of fluid between the chambers for energy absorbing purposes and for controlling the speed of rebound.

Prior energy absorber units mounting a bumper assembly to a vehicle frame have been effectively employed to dissipate the energy of low speed impacts and prevent or reduce vehicle damage. Most of these prior units have been of a relatively complex construction, are difficult to manufacture and materially increase vehicle weight. Generally the prior art energy absorber units do not operate satisfactorily on high speed impacts which often requires their extensive repair or replacement. While some of the better units have full rebound recovery after low speed impact, rebound control delaying time of recovery is through auxiliary construction.

With this invention a new and improved energy absorber unit is provided with simplified structure that enhances assembly while providing a reduction in weight. More specifically the energy absorber unit of this invention incorporates new and improved valve construction for telescoping energy absorber units. The valve is operatively mounted between expandible and contractible chambers of the unit to control the flow of fluid between the chambers in a manner to absorb impact energy. The valving operates for a wide range of speeds from a low to a high vehicle speed to control fluid flow in the unit and dissipate energy of the impact. The valve opening is velocity sensitive and is proportional to the force of pressure built up in one of the chambers as the unit is telescoped in response to impact loading. If there is a sudden high load in this chamber, the valve opens to an extend to provide quick pressure relief so that the unit will not be damaged under high speed impact. The valve member is preferably a one-piece device controlling the flow of fluid through a central opening in a cap attached to the end of the cylinders and which is slidably mounted at the other end of the cylinder. The value has a central disc member, operatively connected to a peripheral portion by a plurality of spring arms, normally closing the central opening. As the energy absorber unit telescopes toward a collapsed position in response to impact load the spring arms yield to permit the center disc to move axially away from the opening so that fluid can flow through the opening and through the valve member from the first to the second chamber. After the unit is stroked and impact energy is abosrbed, the spring arms move the valve disc to a blocking position over the orifice in the cap. Motor means in the unit begins to move the cylinders toward the original extended position. The speed of this return or rebound stroke is modulated by special holes in the control valvve that meter fluid from the second chamber to the first chamber in a manner to reduce the normal speed of recovery to prevent vehicle ramping.

A feature, object and advantage of this invention is to provide a new and improved energy absorbing unit with fluid flow control valve means which responds to a wide range of impacts to make the unit effective in absorbing impact energy and which subsequently controls the speed of rebound.

Another feature, object and advantage of this invention is to provide a new and improved energy absorbing unit with a lightweight fluid flow control valve which operates to control the flow of fluid through an orifice in a cap member by opening in accordance with the amount of pressure in a chamber in the unit having fluid therein and which opens at high speeds to reduce fluid pressure in the chamber so that the unit will not be damaged by high speed impacts.

These and other features, objects and advantages will become more apparent from the following detailed drawings in which:

FIG. is a perspective view of a vehicle chassis frame and energy absorber units mounting a bumper assembly to the frame;

Figure 1:
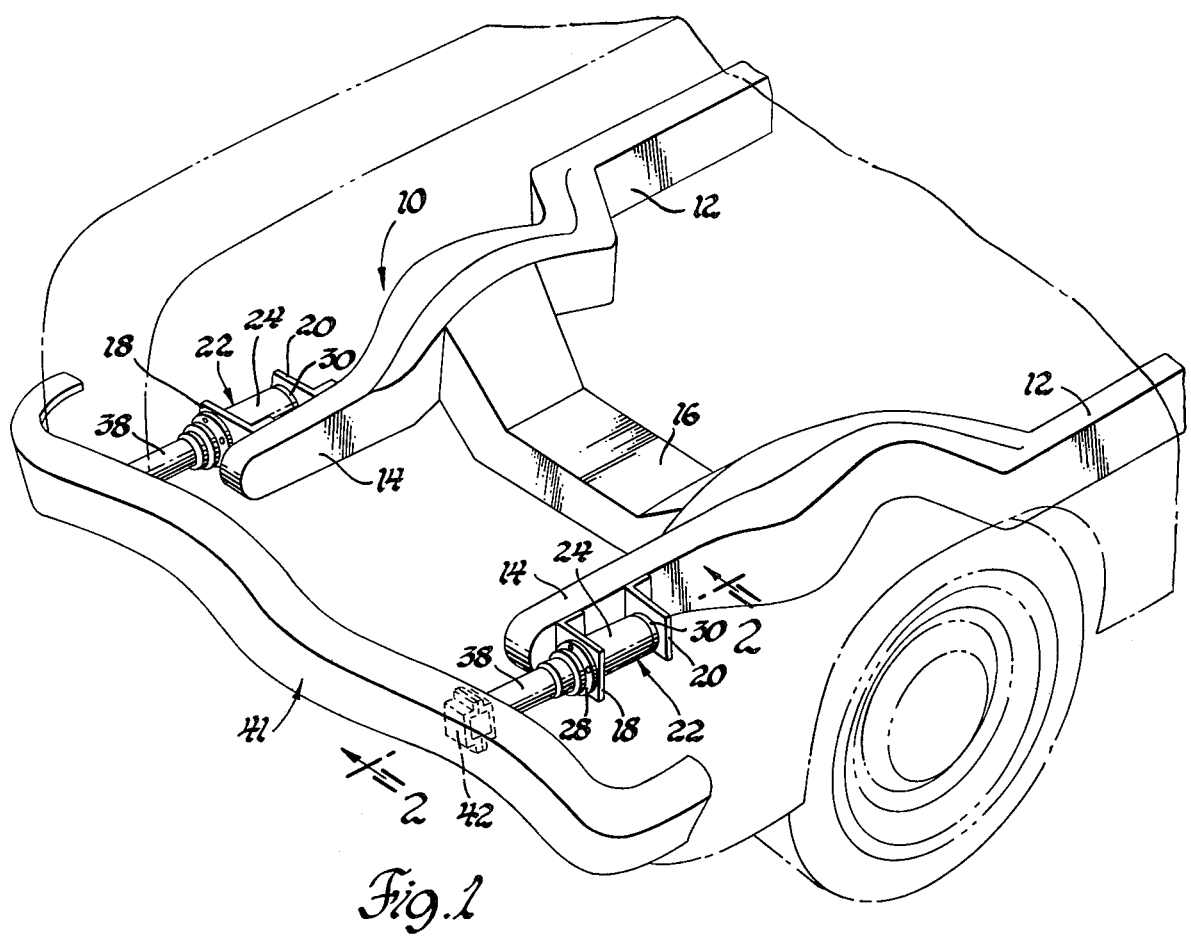

Referring now in particular to FIG. 1 of the drawing, there is a vehicle chassis frame 10 comprising a pair of laterally spaced side rails 12 having forwardly extending horn portions 14 interconnected by a front cross member 16. Bolted to each horn portion 14 are front and rear L-shaped brackets 18 and 20 which are longitudinally spaced from each other that connect identical left and right energy absorber units 22 to the chassis frame 10. Each energy absorber unit 22 extends through a circular opening in its associated front or outermost bracket 18 and has an outer cylinder 24 welded at 26 to a collar 28. The collar 28 is in turn bolted or otherwise rigidly secured to the front bracket 18. The outer cylinder 24 is closed by a circular end cap 30 which is secured thereto by annular weld 31. End cap 30 has an axially-extending threaded stud 32 rigidly fixed thereto which projects outwardly through an opening 34 in bracket 20. Nut 36 threaded onto stud 32 rigidly secures the end cap 30 and thus the outer cylinder 24 to the bracket 20.

In addition to the outer cylinder 24, each energy absorber unit 22 comprises an inner cylinder 38 that is mounted for limited telescoping movement within cylinder 24 and which projects forwardly therefrom. The forward end of the inner cylinder 38 is closed by a base plate 40, welded thereto, which is adapted to be secured to a bumper assembly 41 by suitable connector means 42. Secured to the inner or rearward end of the inner cylinder 38 is a cap 44 that separates the interior of the cylinders into intermediate and rear fluid chambers 46 and 48 each of which is filled with a suitable hydraulic fluid such as oil. A thin walled cylindrical cap sleeve 50 of suitable material such as glass filled nylon is mounted over the cylinder cap 44 to slidably fit the inner diameter of the outer cylinder 24. There is, however, sufficient clearance between the cap sleeve 50 and the inner wall of cylinder 24 so that chamber 48 is in direct hydraulic communication with the inner space 51 formed between the outer and inner cylinders. The forward end of this interspace is sealed by O-ring 52 disposed between cylinders 24 and 38.

Figure 2:
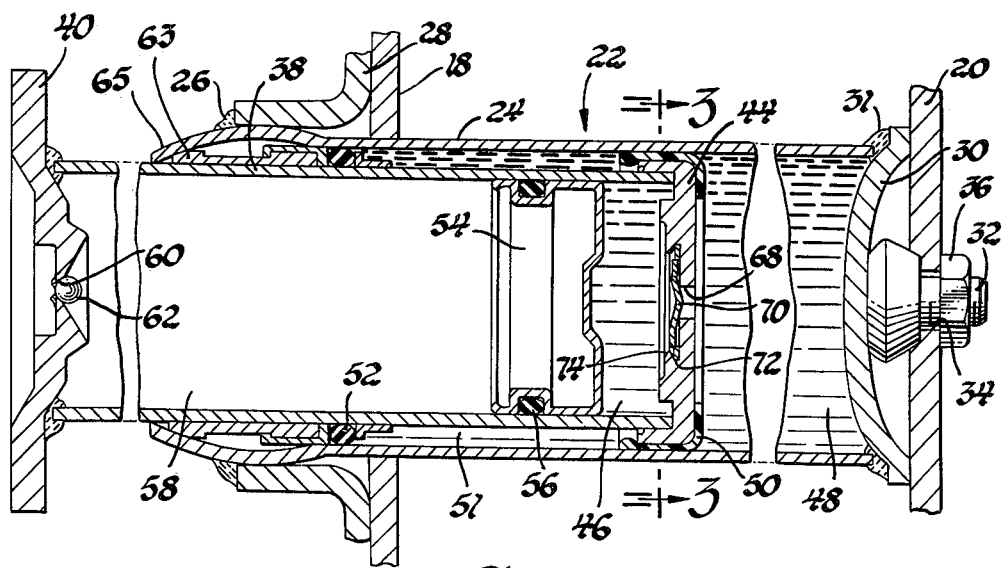
FIG. 2 is an enlarged cross-sectional view taken generally along the plane indicted by lines 2—2 of FIG. 1 showing an energy absorber unit in its normal extended position.
Figure 3:
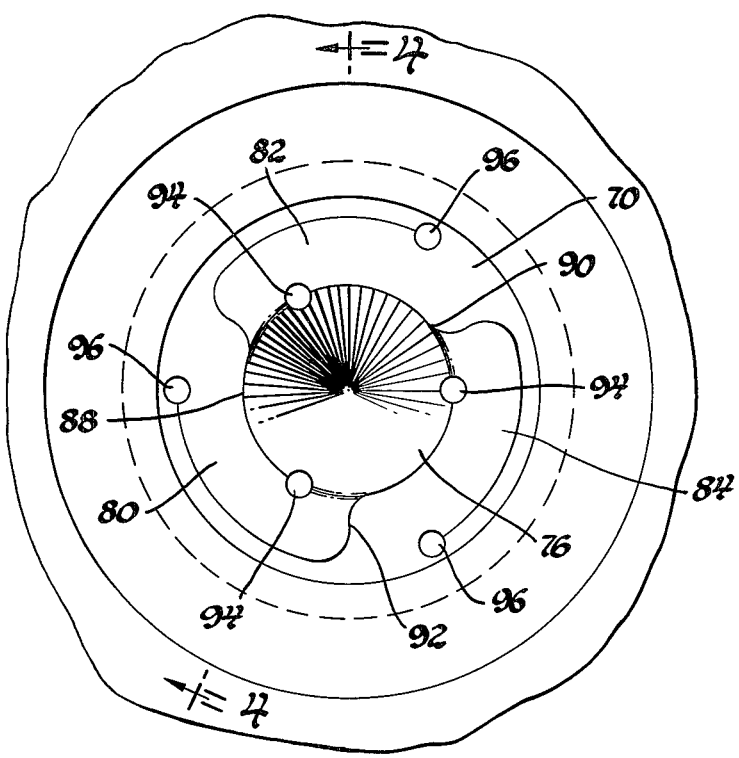
FIG. 3 is a view taken generally along the plane indicated by lines 3—3 of FIG. 2 showing a valve element used in the energy absorber unit of this invention.

Disposed within the inner cylinder 38 is a floting sheet metal piston 54, fitted with an O-ring 56, that separates chamber 46 from a front chamber 58 formed between floating piston 54 and base plate 40. A quantity of gas is compressed in chamber 58 being injected through an orifice 60 formed in the base plate which is subsequently sealed by a ball 62 welded therein. The force of gas compressed within chamber 58 urges the cylinders 38 and 24 to the normally extended position shown in FIGS. 1 and 2. Stop sleeve 63 rigidly secured to cylinder 38 contacts the inwardly crimped end 65 of cylinder 24 to limit the outward movement of cylinder 38 relative to cylinder 24.

Figure 4:
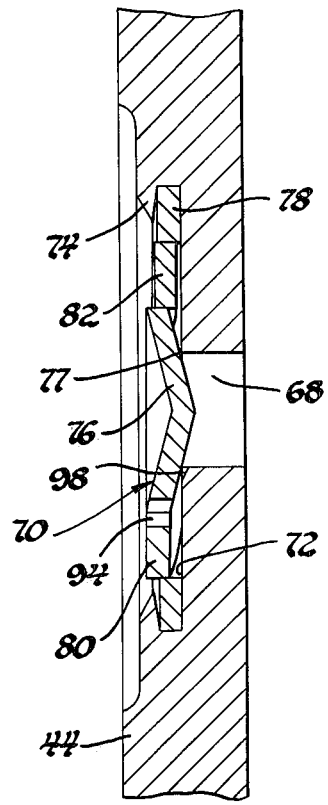
FIG. 4 is a cross-sectional view taken generally along the plane indicated by lines 4—4 of FIG. 3.
Figure 5:
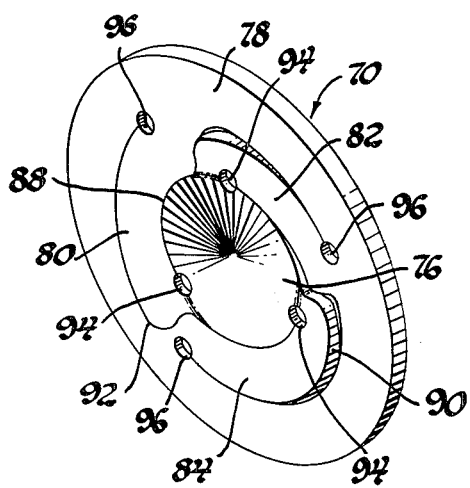
FIG. 5 is a perspective view of the valve element of FIGS. 3 and 4.

The cap sleeve 50 is generally cylindrical in shape and has an outer peripheral portion hooked around the circumferential outer edge of cap 44 and has an inner peripheral portion extending radially inwardly partially covering the front face of the cap 44. Cap 44 is formed with a centralized passage 68 hydraulically connecting chambers 46 and 48. Fluid flow through passage 68 is controlled by a circular valve element 70 mounted in a circular recess 72 in the face of cap 44. The valve element may be fastened in the recess 72 by coining an annular retainer lip 74 from the cap material around the outer periphery of the valve element. In its preferred form, the valve element 70 has a coned centralized disc portion 76 which seats against the circular edge portion 77 of the cap 44 defining the opening of passage 68 to normally restrict the flow of fluid therethrough. The centralized disc portion 76 of the valve element is yieldably secured to an outer peripheral portion 78 by three spring arms 80, 82 and 84 circumferentially disposeed around the disc portion 76. As shown, the valve element 70 is preferably a unitary device with the spring arms and central disc being produced by lancing a metallic blank. The curved cuts or slits 88, 90 and 92 in the valve element made in forming the spring arms and central disc terminate in axial passages such as 94 and 96 which serve as metering passages to bleed fluid from chamber 46 through the central passage 68 to chamber 48 on the rebound stroke so that rebound velocity is reduced. As best shown in FIG. 4 suitable bleed grooves 98 are formed in cap 44 which extend radially from passage 68 to recess 72 so that fluid metered through passages 94 and 96 feeds into passage 66. Suitable clearances may be provided between disc portion 76 and the edge of the passage 68 to eliminate these bleed grooves if desired.

Assuming that the bumper assembly of a vehicle utilizing the energy absorber units of this invention makes contact with a barrier with the vehicle traveling at a low speed such as 3 mph, the energy absorber units will be stroked to absorb the energy of impact. On stroking the cylinder 38 will be moved inwardly with respect to the cylinder 24. Chamber 48 contracts and fluid from this chamber exerts a force on the central disc 76 of the valve element 70 moving it outwardly against the restoring forces of spring arms 80, 82 and 84. As the cylinders telescope fluid from contracting chamber 48 flows through passage 68 and through the openings between the spring arms and the other parts of the valve 70 into expanding chamber 46. The amount of valve opening increases in accordance with increasing impact speeds so that excessive pressure will not be built up in chamber 48. The movement of the fluid from chamber 48 into chamber 46 through the valve dissipates the impact energy. As chamber 46 expands the piston 54 is pushed toward base plate 40 to compress the gas in chamber 58. After the unit is stroked and impact energy is absorbed, the compressed gas in chamber 58 urges the cylinders back toward their original extended position.

Initially, on the return stroke the spring arms 80, 82 and 84 and the pressure in chamber 46 moves the valve disc into engagement with the orifice 68. Fluid from chamber 46 will be bled through the metering holes 94, 96 in the valve element 70, bleed grooves 98 and through the passage 68 to control the rate of return. The holes 94 and 96 are so designed such that the flow supplied into the passage 68 is reduced to a point where the rate of return is substantially reduced to eliminate rebound damage.

In the event that the impact with the barrier is higher than a predetermined low speed, the valve provides for pressure relief in the chamber 48. For example, if a 20 mph impact is made to a barrier, the valve element will move away from the opening 68 and provide a large valve opening to prevent a large build up in pressure in chamber 48. Thus the variable valve opening ensures that the unit will not be damaged from high pressure resulting from higher speed impacts. Energy absorption is accomplished as described above in connection with low speed impact.

The particular valve in this invention opens by an amount proportional to the speed of impact and therefore the unit is tailored for both high and low speed impacts with the higher speed impact requiring progressively higher openings of the valve element. It will be appreciated that the valve element can be readily manufactured from a one-piece metal blank and that weight is reduced as compared to prior art units which incorporates metering pins, floating orifice and auxiliary rebound control.

While a preferred embodiment of this invention has been shown and described, other embodiments will become apparent to those skilled in the art. Accordingly, the limits of this invention are defined in the following claims.

I claim:

1. An impact energy absorbing unit mounting a bumper assembly to a support on an automotive vehicle comprising: first and second cylinders, support means mounting said first cylinder for telescopic movement with respect to said second cylinder between an extended position and a retracted position, said first and second cylinders having cooperating stop means to establish the extended position of said cylinders, said first cylinder having cap means fixed at one end thereof and slidably disposed in said second cylinder to provide variable volume first and second fluid chambers in said unit, a hydraulic fluid in said first and second chambers, a centralized axial fluid passageway through said cap means hydraulically interconnecting said chambers, a one-piece valve element for controlling the flow of fluid in either direction through said passageway, said valve element comprising an outer annular part secured to said cap around said passageway, an inner disc part aligned with said passageway and a plurality of arcuate spring arms disposed in a circle around said inner disc part and attached at equally spaced peripheral point to said inner disc part for yieldably interconnecting said inner disc part to said outer annular part and for biasing said inner disc part into a blocking position relative to said passageway and further being yieldable in response to fluid pressure on said inner disc part to permit said inner disc part to move in a linear path away from said passageway to thereby control the flow of fluid between said chambers in one direction for absorption of energy from an impact load applied to said bumper assembly telescoping said cylinders, motor means to restore said cylinders to said extended position after removal of said impact load, and a plurality of fluid passage means extending through said valve element for metering fluid flow between said chambers in a direction opposite to said one direction as said motor means restores said cylinders to said extended position.

2. An impact energy absorbing unit mounting a bumper assembly to a support on an automotive vehicle comprising: first and second cylinders, support means mounting said first cylinder for telescopic movement with respect to said second cylinder between an extended position and a retracted position, said first and second cylinders having cooperating stop means to establish the extended position of said cylinders, said first cylinder having cap means fixed at one end thereof and slidably disposed in said second cylinder to provide variable volume first and second fluid chambers in said unit, a hydraulic fluid in said first and second chambers, a centralized axial fluid passageway through said cap means hydraulically interconnecting said chambers, a one-piece valve element for controlling the flow of fluid in either direction through said passageway, said valve element comprising an annular outer part secured to said cap, an inner annular disc part aligned with said opening and a plurality of curved slits formed in said valve element between said outer part and inner disc part, said slits providing a pluralitty of arcuate spring arms curving around and surrounding said inner disc part and attached at equally spaced peripheral points to said inner disc part for yieldably interconnecting said inner disc part to said annular outer part and for biasing said inner disc part into a blocking position relative to said passageway, said arms being further yieldable in response to fluid pressure on said inner disc part to permit said inner disc part to move in a linear path away from said passageway to control the flow of fluid between said chambers in one direction for absorption of energy from an impact load applied to said bumper assembly telescoping said cylinders, motor means to restore said cylinders to said extended position after removal of said impact load, and a plurality of fluid passage means in said valve element at terminal points of each of said curved slits for metering fluid flow between said chambers in a direction opposite to said one direction as said motor means restores said cylinders to said extended position.

* * * * *